(12) United States Patent
Leung et al.

(10) Patent No.: US 9,532,438 B2
(45) Date of Patent: Dec. 27, 2016

(54) SYSTEM AND METHOD FOR WIRELESSLY CONTROLLING LED LIGHTING

(71) Applicant: Espot Lighting Limited, Hong Kong (HK)

(72) Inventors: Chun Kai Leung, Hong Kong (HK); Wai Keung Lo, Hong Kong (HK); Yin Ching Chau, Hong Kong (HK)

(73) Assignee: ESPOT LIGHTING LIMITED, Hong Kong (HK)

( * ) Notice: Subject to any disclaimer, the term of this patent is extended or adjusted under 35 U.S.C. 154(b) by 0 days.

(21) Appl. No.: 14/697,683

(22) Filed: Apr. 28, 2015

(65) Prior Publication Data

US 2015/0312994 A1   Oct. 29, 2015

Related U.S. Application Data

(60) Provisional application No. 61/984,871, filed on Apr. 28, 2014.

(51) Int. Cl.
| | |
|---|---|
| *H05B 37/02* | (2006.01) |
| *H05B 39/02* | (2006.01) |
| *H05B 41/36* | (2006.01) |
| *H05B 33/08* | (2006.01) |
| *G08C 17/00* | (2006.01) |

(52) U.S. Cl.
CPC ........... *H05B 37/0272* (2013.01); *G08C 17/00* (2013.01); *H05B 33/0851* (2013.01); *H05B 33/0854* (2013.01); *G08C 2201/40* (2013.01); *Y02B 20/48* (2013.01)

(58) Field of Classification Search
None
See application file for complete search history.

(56) References Cited

U.S. PATENT DOCUMENTS

| | | | |
|---|---|---|---|
| 2014/0285113 A1* | 9/2014 | Huang | H05B 37/0272 315/297 |
| 2015/0200788 A1* | 7/2015 | Thomas | H04M 1/72533 455/420 |

FOREIGN PATENT DOCUMENTS

| | | |
|---|---|---|
| CN | 202679759 U | 1/2013 |
| CN | 203734895 U | 7/2014 |

OTHER PUBLICATIONS

Search Report issued by the Chinese Patent Office on Sep. 26, 2014.

* cited by examiner

*Primary Examiner* — Anh Tran (57) ABSTRACT

A system for wirelessly controlling LED lighting includes: a plurality of LED lamps, each lamp being equipped with a wireless communication module; and a smart device being in communication with the wireless communication module and configured to be controlled by a user. The smart device is configured to generate a unique lamp ID for each LED lamp, and embed the unique lamp ID into a signal for controlling each LED lamp through the wireless communication module so that the unique lamp ID is detectable in a form of visible light. The signal for controlling each LED lamp is a PWM signal, while data rate of the lamp ID is higher than that of the PWM signal. A method for wirelessly controlling LED lighting is also provided.

17 Claims, 11 Drawing Sheets

SYSTEM AND METHOD FOR WIRELESSLY CONTROLLING LED LIGHTING

CROSS-REFERENCE TO RELATED APPLICATIONS

This application claims the benefit of U.S. provisional patent application No. 61/984,871 filed on Apr. 28, 2014; the contents of which is hereby incorporated by reference.

FIELD OF THE PATENT APPLICATION

The present patent application generally relates to lighting electronics and more specifically to a system and a method for wirelessly controlling LED lighting.

BACKGROUND

Conventional wireless LED lighting control system allows a user to control on/off and brightness of LED lamps with the use of wireless communication technologies. An ID is assigned to each LED lamp, while each LED lamp is configured and controlled in a user interface. If there are hundreds of lamps with unique IDs, i.e. more than 100 unique IDs, it is very difficult for a user to divide the lamps into different groups, locate them on a floor plan and control them with a smart device.

Conventionally, the user needs to input the lamp ID of each lamp in a user interface of a smart device. Each lamp must have a label with a unique lamp ID. The user has to manually input the lamp IDs and record their corresponding positions. In addition, the user needs to use a wireless network to search the lamps and display them on a user interface. Using this method, all the lamp IDs will be loaded on the user interface. However, the user does not know which lamp ID represents the corresponding lamp. Also, reliability is another problem since it depends on the stability of the wireless network.

SUMMARY

The present patent application is directed to a system for wirelessly controlling LED lighting. In one aspect, the system includes: a plurality of LED lamps, each lamp being equipped with a wireless communication module; a wireless gateway that includes a first communication device, a signal conversion module being connected with the first communication device, a micro-controller being connected with the signal conversion module, a second communication device being connected with the micro-controller and in communication with the wireless communication module of each LED lamp, and an AC/DC power module being connected with the micro-controller; and a smart device being in communication with the wireless gateway and configured to be controlled by a user. The signal conversion module is configured to convert communication data between the first communication device and the second communication device. The AC/DC power module is configured to convert AC power into DC power to supply to the first communication device, the second communication device, the micro-controller and the signal conversion module. The micro-controller is configured to generate a unique lamp ID for each LED lamp, and embed the unique lamp ID into a signal for controlling each LED lamp through the wireless communication module so that the unique lamp ID is detectable in a form of visible light.

The micro-controller and the second communication device may be packaged together to form a communication module. The system may further include a router connected with the wireless gateway and configured to receive command signals from a mobile device or the Internet and send command signals to the wireless gateway.

The system may further include a wireless sensor module. The wireless sensor module may include a micro-controller, a wireless communication device connected to the micro-controller, and a sensor connected to the micro-controller. The wireless communication device may be configured to be in communication with the wireless gateway and the wireless communication module of each LED lamp.

The sensor may be an ambient light sensor, and configured to send an ambient light signal level to surrounding LED lamps, while the micro-controller of the wireless sensor module may be configured to adjust light of each lamp according to the ambient light signal level.

The sensor may be a motion sensor, and configured to send a command to surrounding LED lamps to turn on the lamps upon detection of a motion signal.

The smart device may include an optical receiver configured to receive visible light data generated from the LED lamps. The optical receiver may be a dongle including an optical sensor configured to receive a lamp ID modulated by light, a detection circuit connected to the optical sensor and configured to demodulate the lamp ID, a micro-controller connected with the detection circuit and configured to send command signals and receive signals, and a USB interface connected to the micro-controller and configured to transfer data to the smart device.

The system may further include a detection circuit. The detection circuit may include a filtering circuit configured to filter out visible light signal, and a competitor connected to the filtering circuit and configured to take an output of the filtering circuit and a received visible light signal as inputs thereof.

The system may further include a LED driver for driving each LED lamp. A guard time may be present between a time period for generation of lamp ID data by the LED driver and a time period for receiving a command from a user to switch the system from a configuration mode to a lighting control mode.

The signal for controlling each LED lamp may be a PWM signal, while data rate of the lamp ID may be higher than that of the PWM signal. A start bit and a stop bit along with data of the lamp ID may be embedded together into the PWM signal. Data of an original lamp ID plus inversed data of the original lamp ID may be embedded into the PWM signal.

In another aspect, the system for wirelessly controlling LED lighting includes: a plurality of LED lamps, each lamp being equipped with a wireless communication module; and a smart device being in communication with the wireless communication module and configured to be controlled by a user. The smart device is configured to generate a unique lamp ID for each LED lamp, and embed the unique lamp ID into a signal for controlling each LED lamp through the wireless communication module so that the unique lamp ID is detectable in a form of visible light. The signal for controlling each LED lamp is a PWM signal, while data rate of the lamp ID is higher than that of the PWM signal. A start bit and a stop bit along with data of the lamp ID are embedded together into the PWM signal. Data of an original lamp ID plus inversed data of the original lamp ID are embedded into the PWM signal.

The system may further include a wireless sensor module, wherein the wireless sensor module may include a micro-controller, a wireless communication device connected to the micro-controller, and a sensor connected to the micro-controller, the wireless communication device being configured to be in communication with the wireless communication module of each LED lamp.

The smart device may include an optical receiver configured to receive visible light data generated from the LED lamps.

In yet another aspect, the present patent application provides a method for wirelessly controlling LED lighting. The method includes: turning on a plurality of LED lamps with a preset level; generating a unique lamp ID for each LED lamp and embedding the unique lamp ID into a signal for controlling the LED lamp through a wireless gateway and a wireless communication module; placing a smart device under light of a LED lamp and entering a configuration mode; receiving the lamp ID of the LED lamp, displaying the lamp ID in a user interface of the smart device, and designating an icon to represent the LED lamp in the user interface; switching to a lighting control mode and stopping the LED lamp from generating lamp IDs; and controlling the LED lamps with the signal by a user through a user interface on the smart device. The wireless gateway includes: a first communication device; a signal conversion module being connected with the first communication device; a micro-controller being connected with the signal conversion module; a second communication device being connected with the micro-controller and in communication with the wireless communication module of each LED lamp; and an AC/DC power module being connected with the micro-controller.

The signal for controlling each LED lamp may be a PWM signal, while data rate of the lamp ID may be higher than that of the PWM signal. A start bit and a stop bit along with data of the lamp ID may be embedded together into the PWM signal. Data of an original lamp ID plus inversed data of the original lamp ID may be embedded into the PWM signal.

DETAILED DESCRIPTION

Reference will now be made in detail to a preferred embodiment of the system and the method for wirelessly controlling LED lighting disclosed in the present patent application, examples of which are also provided in the following description. Exemplary embodiments of the system and the method for wirelessly controlling LED lighting disclosed in the present patent application are described in detail, although it will be apparent to those skilled in the relevant art that some features that are not particularly important to an understanding of the system and the method for wirelessly controlling LED lighting may not be shown for the sake of clarity.

Furthermore, it should be understood that the system and the method for wirelessly controlling LED lighting disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

A system for wirelessly controlling LED lighting including a plurality of LED lamps, each lamp being equipped with a wireless communication module, a wireless gateway and a mobile control device (also referred to as a "smart device") is provided by an embodiment of the present patent application. The wireless gateway includes two types of wireless communication modules and a signal conversion module so that more than one communication technologies can be used for lighting control.

Figure 1:
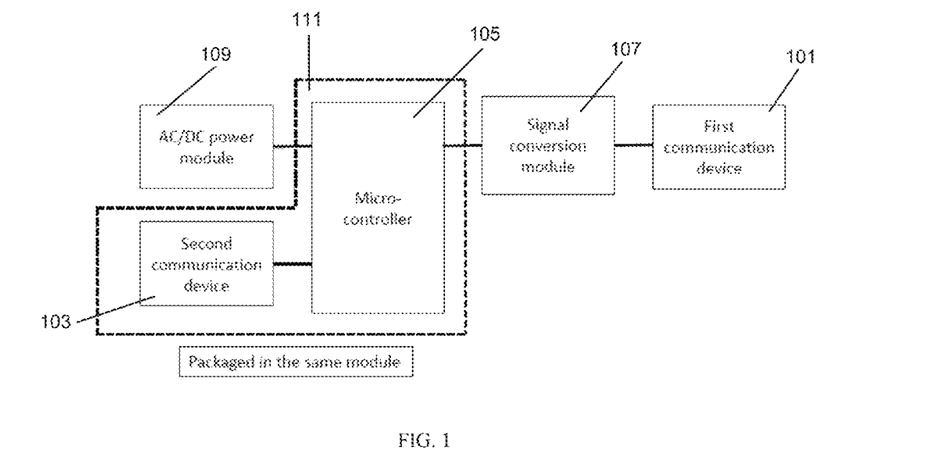
FIG. 1 is a block diagram of a wireless gateway in a system for wirelessly controlling LED lighting in accordance with an embodiment of the present patent application.

FIG. 1 is a block diagram of a wireless gateway in a system for wirelessly controlling LED lighting in accordance with an embodiment of the present patent application. Referring to FIG. 1, the wireless gateway includes a first communication device 101, a second communication device 103, a micro-controller 105, a signal conversion module 107, and an AC/DC power module 109. The signal conversion module 107 is connected with the first communication device 101. The micro-controller 105 is connected to the signal conversion module 107. The second communication device 103 is connected to the micro-controller 105 and in communication with the wireless communication module of each LED lamp. The AC/DC power module 109 is also connected to the micro-controller module 105.

In this embodiment, the micro-controller 105 and the second communication device 103 are packaged together to form a communication module 111. The signal conversion module 107 is configured to convert communication data to/from the format of the first communication device 101 from/to the format of the second communication device 103. Examples include a ZigBee to DMX system and a RS-485 to RS-232 conversion module. The AC/DC power module 109 is configured to convert AC power into DC power to supply to the first communication device 101, the second communication device 103, the micro-controller 105 and the signal conversion module 107. The micro-controller 105 is configured to generate a unique lamp ID for each LED lamp, and embed the unique lamp ID into a signal for controlling each LED lamp through the wireless communication module so that the unique lamp ID is detectable in a form of visible light.

Figure 2:
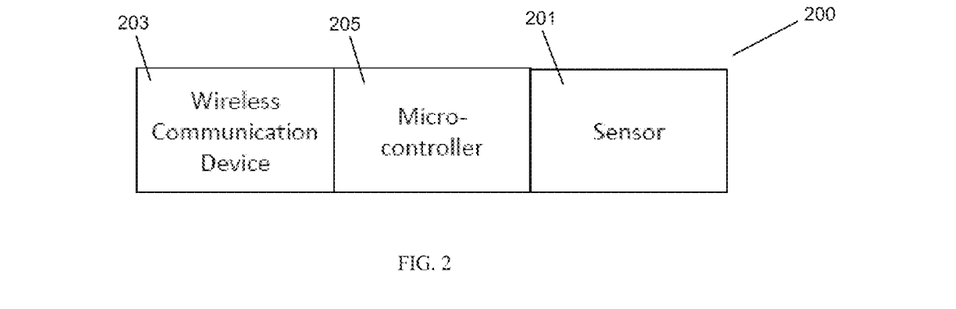
FIG. 2 is a block diagram of a wireless sensor module in a system for wirelessly controlling LED lighting in accordance with an embodiment of the present patent application.

The wireless LED lighting control system may further include a wireless sensor module. FIG. 2 is a block diagram of the wireless sensor module in accordance with an embodiment of the present patent application. Referring to FIG. 2, the wireless sensor module 200 includes a micro-controller 205, a wireless communication device 203 connected to the micro-controller 205, and a sensor 201 connected to the micro-controller 205. The sensor 201 can be an ambient light sensor, a passive infrared (PIR) motion sensor, a Doppler motion sensor or a hybrid type motion sensor such as a PIR+Doppler motion sensor. In an embodiment, the sensor 201 is a PIR sensor and configured to measure the temperature of human and work as an occupancy sensor. The wireless communication device 203 is configured to be in communication with wireless gateway in FIG. 1 and the wireless communication module of each LED lamp.

Figure 3A:
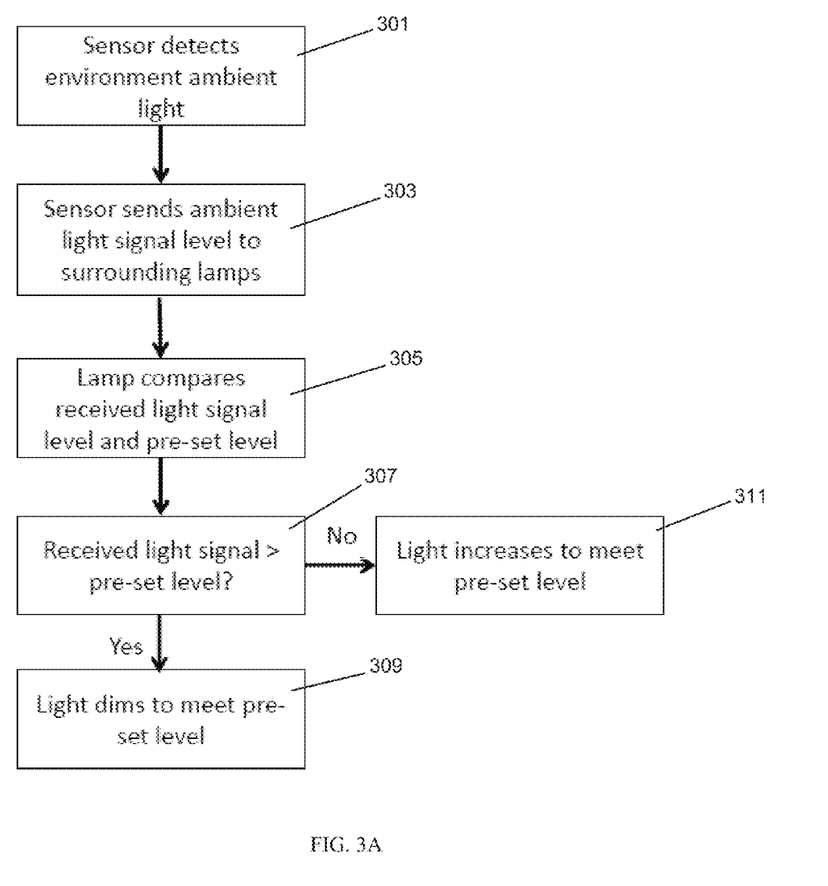
FIG. 3A is a flow chart illustrating an operation of an ambient light sensor in a system for wirelessly controlling LED lighting in accordance with an embodiment of the present patent application.

In one embodiment, the sensor 201 is an ambient light sensor. FIG. 3A is a flow chart illustrating an operation of the ambient light sensor. Referring to FIG. 3A, in step 301, the sensor detects the environment ambient light. In step 303, the sensor sends an ambient light signal level to surrounding LED lamps through the wireless communication device 203 and the wireless communication module of each LED lamp. In step 305, the LED lamp compares the received light signal level with a pre-set level. If the received ambient light signal level is greater than pre-set level (step 307), the light of the lamp will be dimmed down to its pre-set level by the micro-controller 205 (step 309). If the received ambient light signal level is lower than pre-set level (step 307), the light of the lamp will be increased to its pre-set level by the micro-controller 205 (step 311).

Figure 3B:
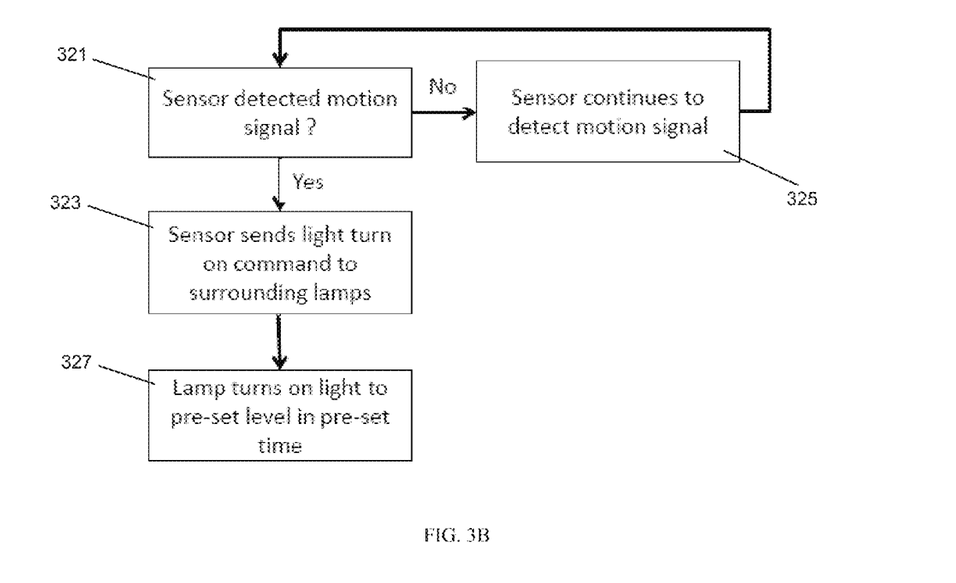
FIG. 3B is a flow chart illustrating an operation of a motion sensor in a system for wirelessly controlling LED lighting in accordance with an embodiment of the present patent application.

In another embodiment, the sensor 201 is a motion sensor. FIG. 3B is a flow chart illustrating an operation of the motion sensor. Referring to FIG. 3B, if the sensor detects a motion signal (step 321), the sensor will send a "turn-on" command to the surrounding LED lamps (step 323) and the LED lamps will turn on to their pre-set light levels for a pre-set time period (step 327). If there is no motion signal (step 321), the sensor will continue to detect motion signal (step 325).

Figure 4:
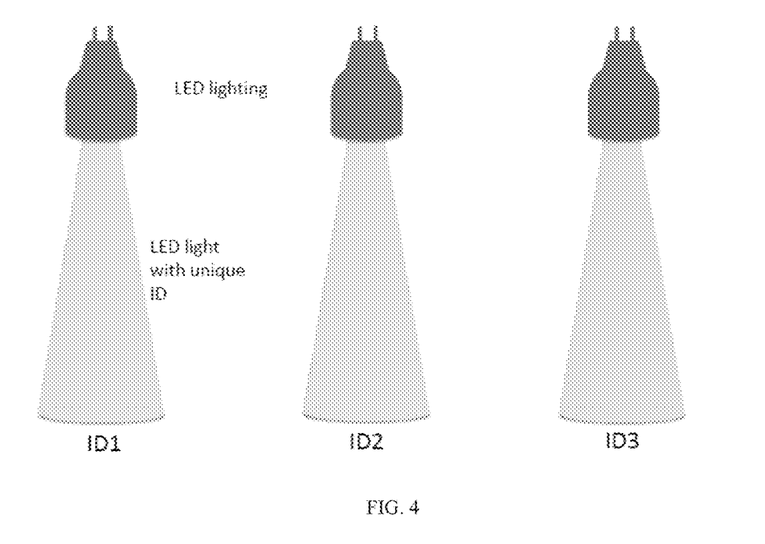
FIG. 4 illustrates a unique ID is generated for each lamp in the form of visible light signal by a system for wirelessly controlling LED lighting in accordance with an embodiment of the present patent application.

As shown in FIG. 4, according to an embodiment, the system for wirelessly controlling LED lighting generates a unique ID for each lamp in the form of visible light signal during configuration. With the use of visible light signal, there is no extra hardware cost to equip the system with two communication modules. Only software command is needed to request the LED lamps to generate visible data ID for installation. After configuration is completed, the user only needs to send command signals to the LED lamps and can control light with different dimming mode. It is understood that the generation of the unique ID is executed by the micro-controller 105 of the gateway.

Figure 5:
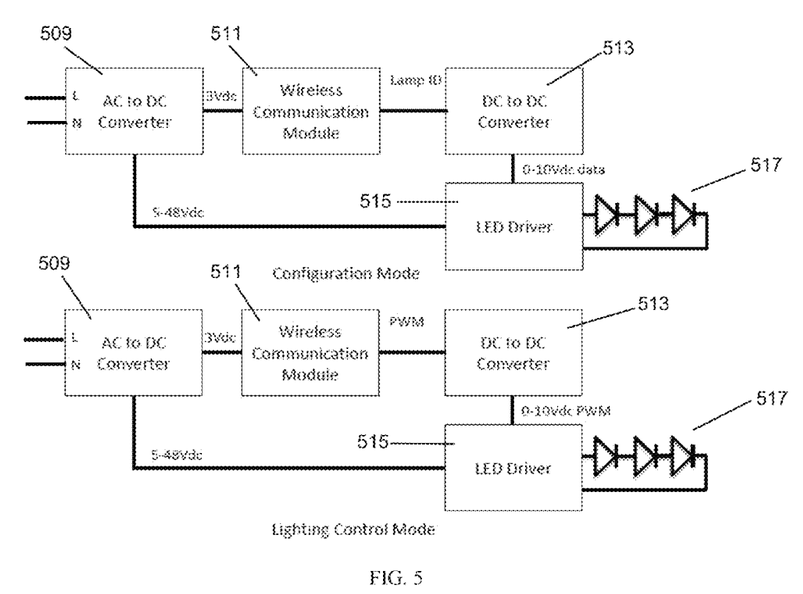
FIG. 5 illustrates a system for wirelessly controlling LED lighting in accordance with an embodiment of the present patent application operating in a configuration mode and a lighting control mode.

Referring to FIG. 5, in another embodiment, the system for wirelessly controlling LED lighting operates in a configuration mode and a lighting control mode. The AC/DC converter 509 converts AC power from 110/220 Vac to 3 Vdc and 5-48 Vdc. 3 Vdc is used for the wireless communication module 511 and 5-48 Vdc is used for a LED driver 515. The voltage depends on the forward voltage of LED lamps 517. Also, a lamp ID and a pulse-width modulation (PWM) signal are generated by the micro-controller in the wireless communication module 511. A DC/DC converter 513 is configured to provide the voltage level needed for the LED driver 515 so that the data/PWM signal from the LED driver can be used to turn ON/OFF the LED lamps 517.

Figure 6:
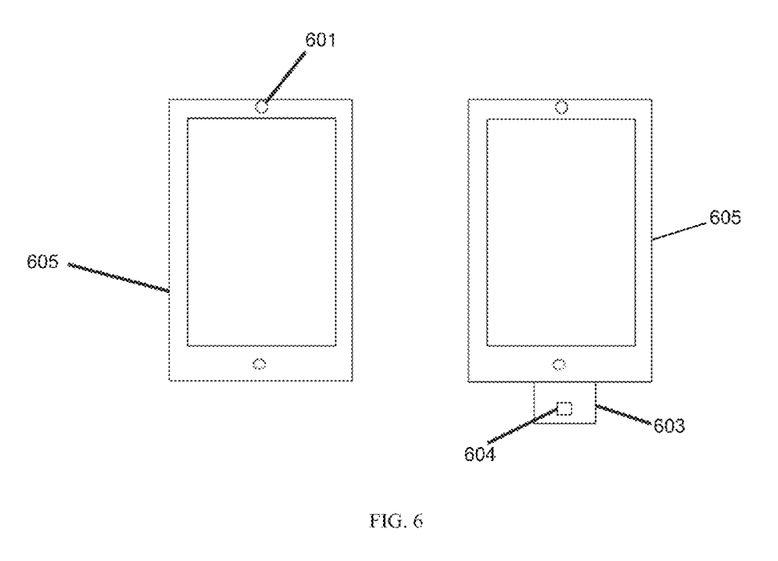
FIG. 6 illustrates an optical receiver working with a smart device in a system for wirelessly controlling LED lighting in accordance with an embodiment of the present patent application.

To configure and control the LED lamps 517 with a smart device, an optical receiver is needed. As shown in FIG. 6, the optical receiver can be a dongle 603 carrying an optical sensor 604 plugged into the smart device 605 or a camera 601 equipped in the smart device 605, while the optical receiver is configured to receive visible light data generated from LED lamps.

Figure 7:
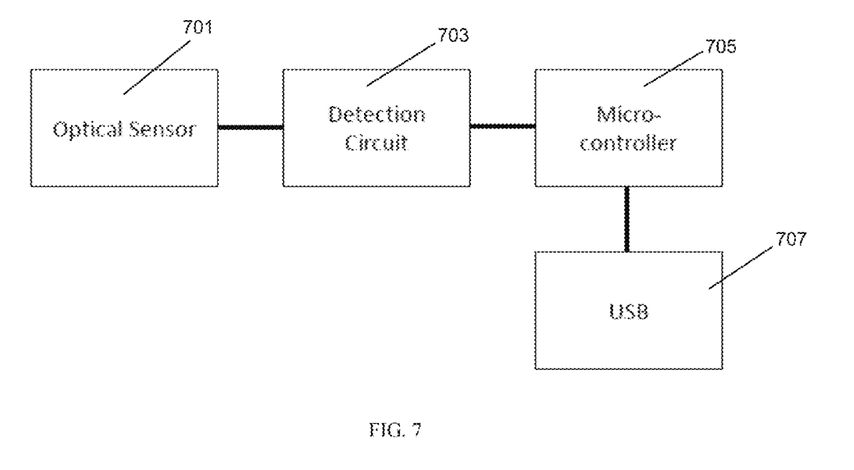
FIG. 7 is a block diagram of the optical receiver depicted in FIG. 6.

FIG. 7 is a block diagram of the optical receiver depicted in FIG. 6. Referring to FIG. 7, the optical receiver includes an optical sensor 701 (e.g. light sensor, photodiode) configured to receive a lamp ID modulated by light (On-OFF keying), a detection circuit 703 connected to the optical sensor 701 and configured to demodulate the lamp ID, a micro-controller 705 connected with the detection circuit and configured to send command signals and receive signals, and a USB interface 707 connected to the micro-controller 705 and configured to transfer data to the smart device.

Figure 8:
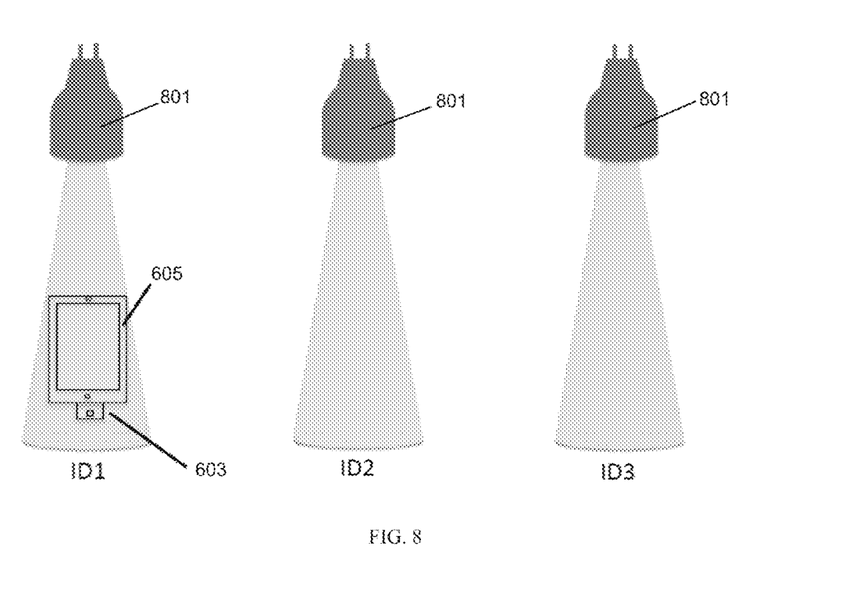
FIG. 8 illustrates a smart device with an optical receiver depicted in FIG. 6 being placed under LED lamps.

Referring to FIG. 6 and FIG. 7, if the camera 601 of the smart device 605 is used as the optical receiver, only software programming is needed to decode the visible light data. Hence, the user only needs to place the smart device 605 under the LED lamps 801 as shown in FIG. 8, the lamp ID will be shown in a user interface of the smart device.

Figure 9:
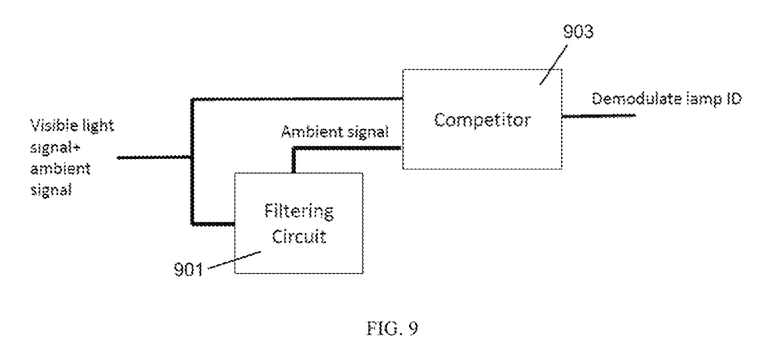
FIG. 9 illustrates a detection circuit in a system for wirelessly controlling LED lighting in accordance with an embodiment of the present patent application.

In practice, the optical sensor receives both visible light signal and ambient light signal from the surrounding environment. The ambient light signal is variable and depends on the light intensity of the surrounding environment. Therefore, in an embodiment, the system further includes a detection circuit as shown in FIG. 9 configured to increase the sensitivity of the optical receiver. Referring to FIG. 9, the detection circuit includes a filtering circuit 901 configured to filter out visible light signal, and a competitor 903 connected to the filtering circuit 901 and configured to use the ambient light signal, i.e. the received variable DC, as the competitive level for the received visible light signal. As shown in FIG.

9, the competitor 903 takes an output of the filtering circuit and a received visible light signal as inputs thereof. Therefore, the competitive level is dynamic and dependent on the working environment.

Figure 10:
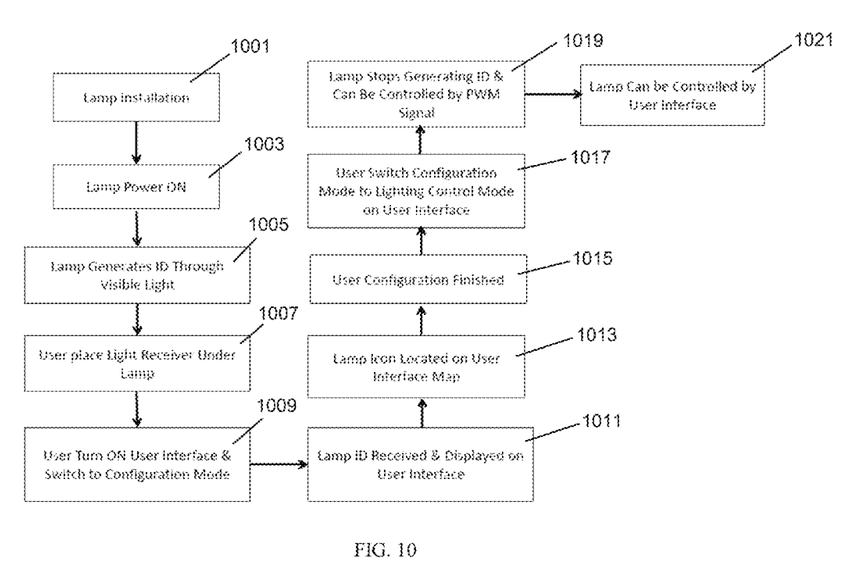
FIG. 10 is a flow chart illustrating a method for wirelessly controlling LED lighting in accordance with an embodiment of the present patent application.

FIG. 10 is a flow chart illustrating a method for wirelessly controlling LED lighting in accordance with an embodiment of the present patent application. Referring to FIG. 10, the method includes the following steps.

Step 1001: LED lamps are installed to lighting fixtures.

Step 1003: All the LED lamps are turned on.

Step 1005: If it is a new LED lamp, the lamp will generate a unique lamp ID in the form of visible light data automatically. If the LED lamps do not transmit lamp IDs (lighting control mode), the user can use the smart device to request all the lamps to transmit their IDs (configuration mode).

Step 1007: the user places the smart device with the optical receiver under the lamp to be configured.

Step 1009: the user opens the user interface/apps of the lighting control system in the smart device and select the configuration mode.

Step 1011: the visible light signal from the lamp is received by the optical receiver and the lamp ID will be displayed on the user interface.

Step 1013: the user can designate an icon to represent the lamp on a map in the user interface;

Step 1015: user configuration is finished.

Step 1017: the user switches from the configuration mode to the lighting control mode through the user interface.

Step 1019: all the lamps stop generating lamp IDs and wait for commands.

Step 1021: the user can control lamps with the corresponding IDs by the smart device.

Figure 11:
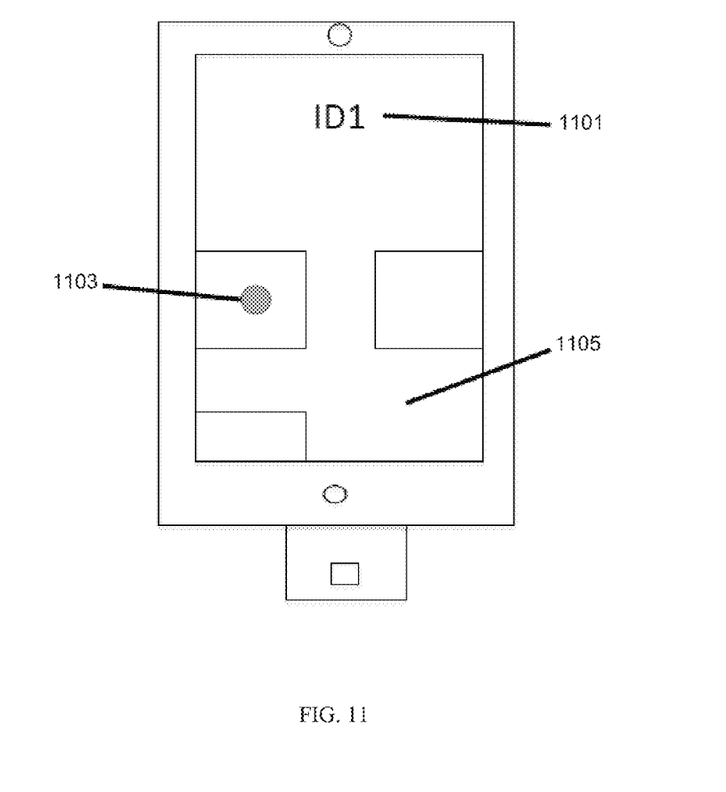
FIG. 11 shows a user interface for lamp configuration of a system for wirelessly controlling LED lighting in accordance with an embodiment of the present patent application.

FIG. 11 shows a user interface for lamp configuration of a system for wirelessly controlling LED lighting in accordance with an embodiment of the present patent application. Referring to FIG. 11, once the optical receiver receives the visible light ID data of a LED lamp, the lamp ID 1101 will be shown on the user interface. An icon 1103 representing the LED lamp will be generated. The user can place the icon on a floor plan 1105. Therefore, the LED lamp for that position can be located and the user can easily control the lamp in the exact position. After configuration of the lamps, the user only needs to change the program on the user interface to the lighting control mode.

Figure 12:
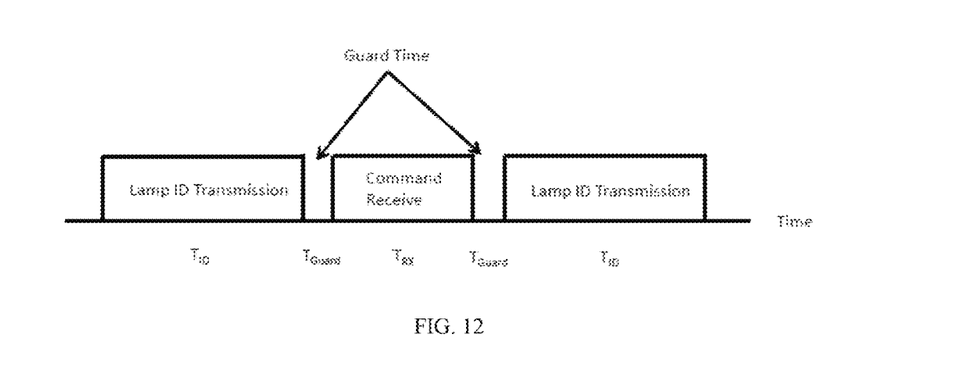
FIG. 12 is a timing diagram of a system for wirelessly controlling LED lighting in accordance with an embodiment of the present patent application.

FIG. 12 is a timing diagram of a system for wirelessly controlling LED lighting in accordance with an embodiment of the present patent application. Referring to FIG. 12, in the configuration mode, time $T_{ID}$ indicates a time period for generation of lamp ID data by the LED driver of the system. Time $T_{RX}$ represents a time period for receiving a command from the user to switch the system from the configuration mode to the lighting control mode. A guard time $T_{Guard}$ is present to avoid overlapping of switching time between two modes.

Figure 13:
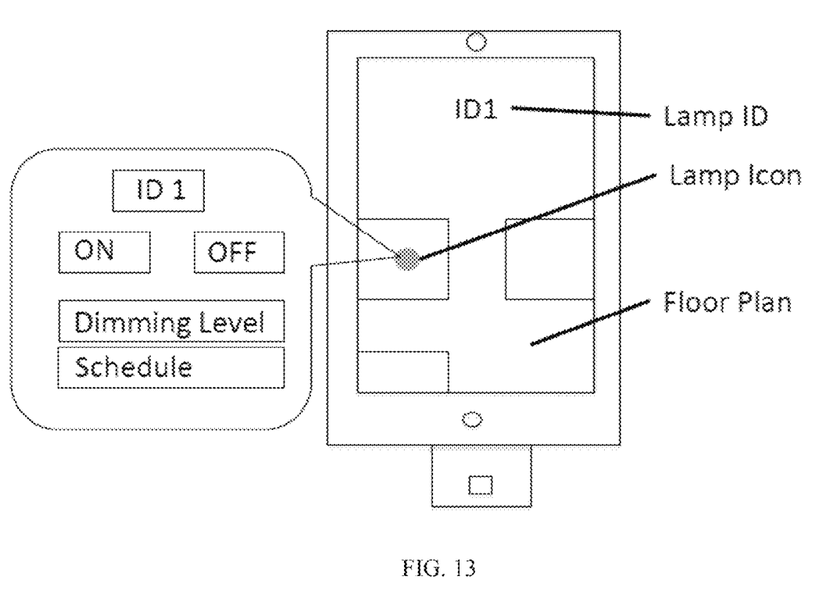
FIG. 13 illustrates a lighting control mode of a system for wirelessly controlling LED lighting in accordance with an embodiment of the present patent application.

In the lighting control mode, as shown in FIG. 13, the user can control all the lights output including ON/OFF, brightness, schedule and color changing. Also, several unique lamp IDs can be grouped together to perform light group control.

Figure 14A:
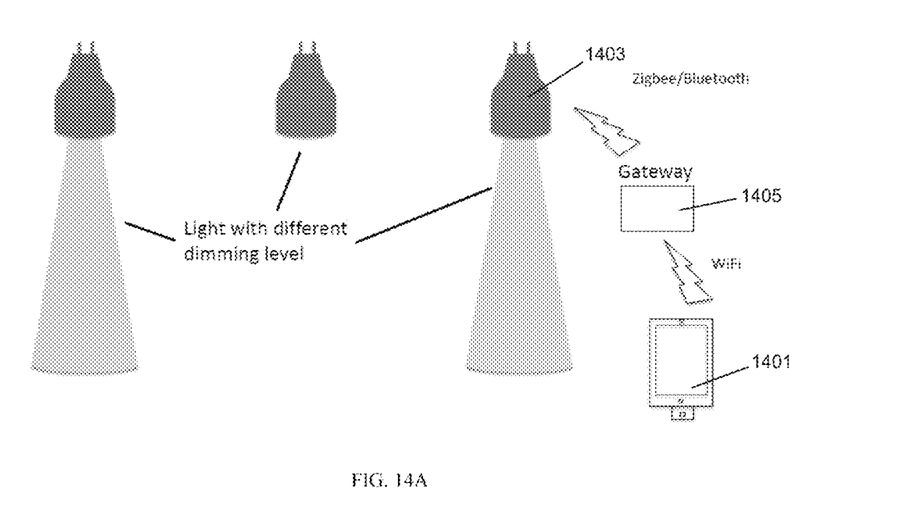
FIG. 14A illustrates a system for wirelessly controlling LED lighting in accordance with an embodiment of the present patent application.
Figure 14B:
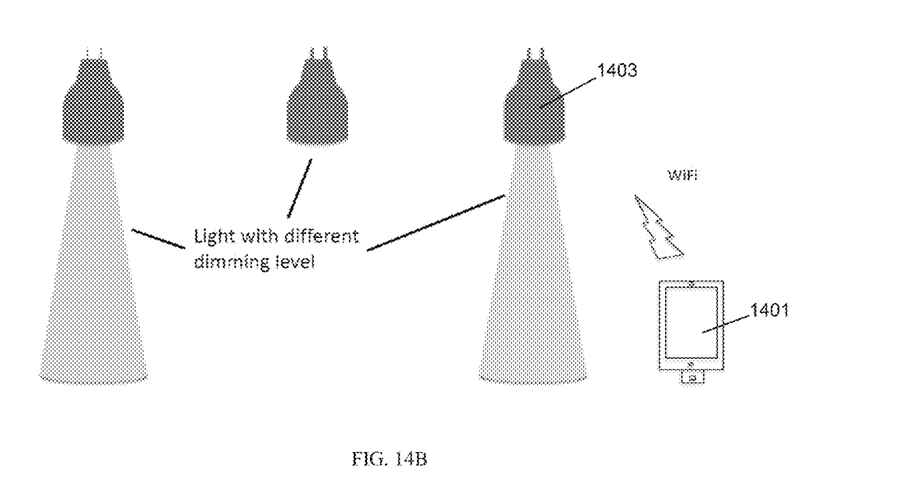
FIG. 14B illustrates a system for wirelessly controlling LED lighting in accordance with another embodiment of the present patent application.

FIG. 14A illustrates a system for wirelessly controlling LED lighting in accordance with an embodiment of the present patent application. Referring to FIG. 14A, the user can use a smart device 1401 to send command signals to the wireless gateway 1405 (as illustrated in FIG. 1) through Wi-Fi which in turn controls LED lamps 1403 through ZigBee/Bluetooth. FIG. 14B illustrates a system for wirelessly controlling LED lighting in accordance with another embodiment of the present patent application. Referring to FIG. 14B, if the system is equipped with Wi-Fi as a wireless communication module, the user can use a smart device 1401 to control LED lamps 1403 directly by Wi-Fi.

Practically, during system configuration and generation of lamp IDs, there are chances that lights overlap. The visible light ID will interfere with each other and the optical receiver cannot receive the correct ID. Therefore, lights should be dimmed to a certain level during system configuration and generation of lamp ID in order to avoid interference.

Figure 15:
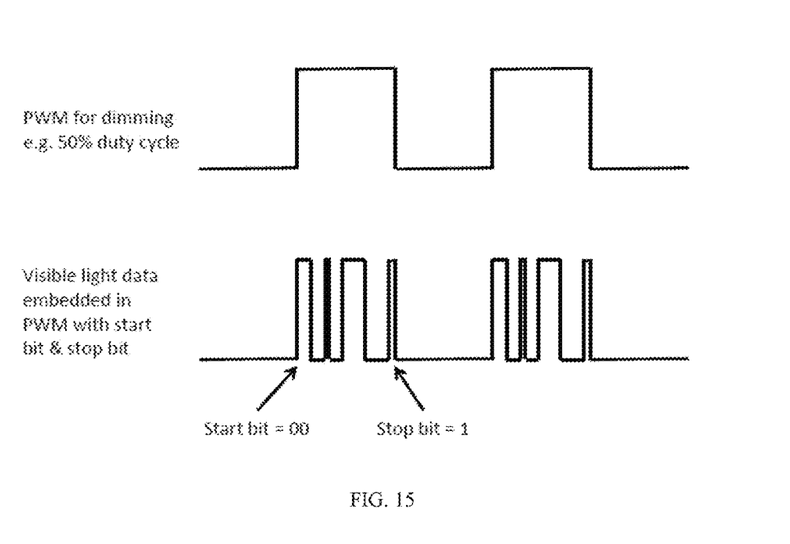
FIG. 15 illustrates a start bit and stop bit along with lamp ID data are embedded together into a PWM signal used by a system for wirelessly controlling LED lighting in accordance with an embodiment of the present patent application.

In addition, light output is controlled by PWM signal. The optical receiver will also receive the PWM signal and cannot recognize the lamp ID data. To overcome this problem, a start bit and stop bit along with the lamp ID data are embedded together into the PWM signal, as shown in FIG. 15. Therefore, the data rate of the lamp ID must be higher than that of the PWM signal. For example, PWM data rate is 500 Hz and the lamp ID data rate is 9.6 kHz. The optical receiver can then decode the lamp ID by recognized the start bit and stop bit and ignore the PWM signal.

Since light intensity cannot remain the same among the LED lamps if only data is modulated, this will affect the detection range of the optical receiver. Therefore, a method as shown in FIG. 16 is proposed to maintain uniform light intensity among the LED lamps.

Figure 16:
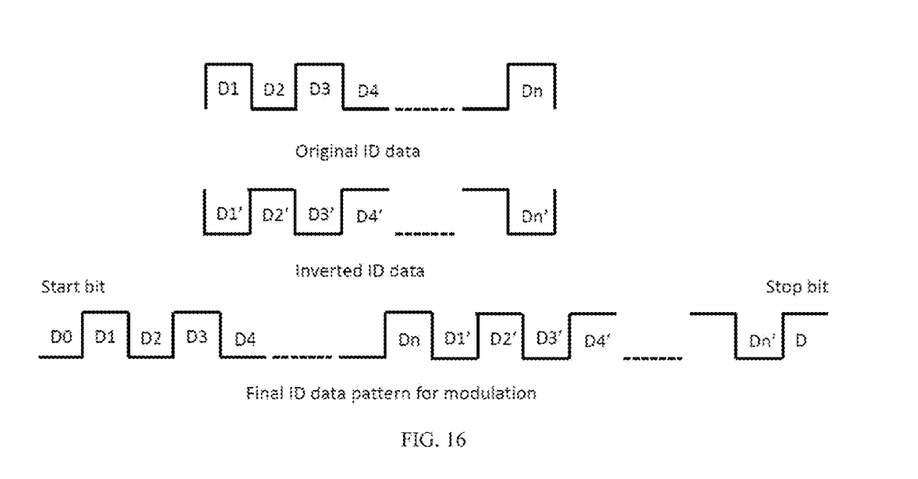
FIG. 16 illustrates a method of modulating light intensity with lamp ID data used by a system for wirelessly controlling LED lighting in accordance with an embodiment of the present patent application.

Referring to FIG. 16, average signal=original data+inverse data

Accordingly, the modulated lamp ID data contains the original lamp ID data plus the inversed lamp ID data. The light intensity of the LED lamps can be maintained the same within 5% of deviation.

Another advantage of using this approach is that the received inverse data can be used for data checking of the received lamp ID data. Therefore, the reliability and security of the incoming data can be improved.

Figure 17:
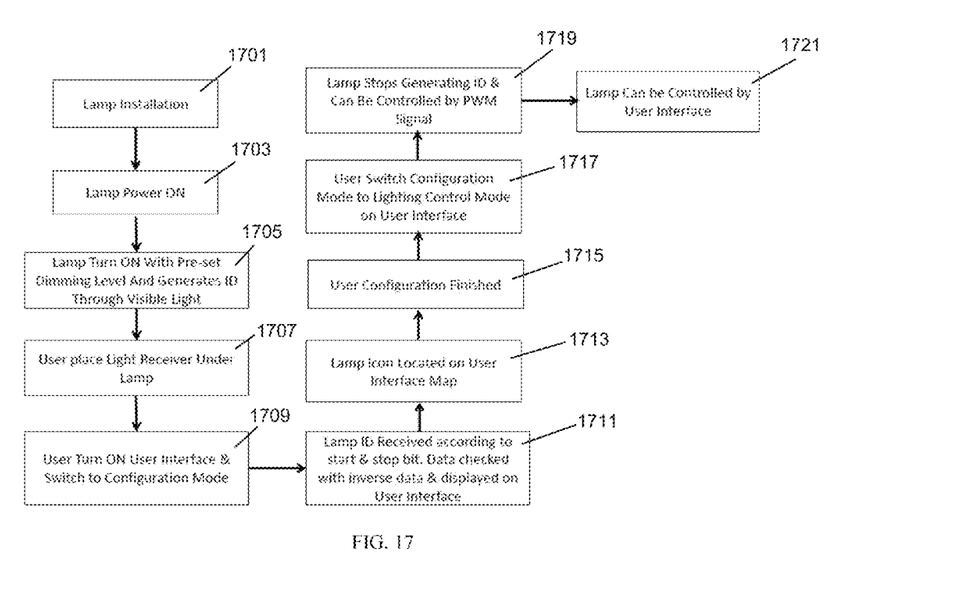
FIG. 17 is a flow chart illustrating a method for wirelessly controlling LED lighting in accordance with an embodiment of the present patent application.

FIG. 17 is a flow chart illustrating a method for wirelessly controlling LED lighting in accordance with an embodiment of the present patent application. Referring to FIG. 17, the method includes the following steps.

Step 1701: LED lamps are installed to lighting fixtures.

Step 1703: All the LED lamps are turned on.

Step 1705: If it is a new LED lamp, the lamp will generate a unique lamp ID in the form of visible light data automatically and its light intensity will be regulated automatically to its pre-set level. If the LED lamps do not transmit lamp IDs (lighting control mode), the user can use the smart device to request all the lamps to transmit their IDs (configuration mode).

Step 1707: the user places the smart device with the optical receiver under the lamp to be configured.

Step 1709: the user opens the user interface/apps of the lighting control system in the smart device and select the configuration mode.

Step 1711: the visible light signal from the lamp is received by the optical receiver, which will be demodulated according to the start and stop bit. The demodulated ID will be checked by the demodulated inverse ID and the lamp ID will be displayed on the user interface.

Step 1713: the user can designate an icon to represent the lamp on a map in the user interface.

Step 1715: user configuration is finished.

Step 1717: the user switches from the configuration mode to the lighting control mode through the user interface.

Step 1719: all the lamps stop generating lamp IDs and wait for commands.

Step 1721: the user can control the lamps with the corresponding IDs by the smart device.

In another embodiment of the present patent application, a system for wirelessly controlling LED lighting includes: a plurality of LED lamps, each lamp being equipped with a wireless communication module; a wireless gateway that includes at least two different types of wireless communication modules and a signal conversion module; a router connected with the wireless gateway and configured to receive command signals from a mobile device or the Internet and send command signals to the wireless gateway; and a smart device for controlling the system by a user.

The wireless communication module in the LED lamps operates with common wireless communication technologies such as ZigBee, Bluetooth, etc. The gateway is equipped with different types of wireless communication modules, so at least one communication method can be used to control LED lamps. The wireless LED lighting control system can be controlled by a smart device such as mobile phone, tablet, computer, etc.

In the above embodiments, a method of lighting control using visible light to generate lamp IDs is also provided. Visible light transmission method is used to transmit lamp IDs. A smart device such as a tablet or mobile phone with an optical receiver is used to receive the lamp IDs and indicate them on the user interface. The hardware of wirelessly controlled LED drivers can be used for lamp ID generation or lighting control. Therefore, there is no additional hardware cost for the design and users can easily setup and configure their lighting systems.

One of the applications of the system for wirelessly controlling LED lighting is indoor positioning. Since lamps can generate unique IDs through visible light, the user can place the optical receiver under a lamp and the position of the optical receiver i.e. location of the person/object can be show on the interface of the mobile device.

While the present patent application has been shown and described with particular references to a number of embodiments thereof, it should be noted that various other changes or modifications may be made without departing from the scope of the present invention.

What is claimed is:

1. A system for wirelessly controlling LED lighting comprising:
   a plurality of LED lamps, each lamp being equipped with a wireless communication module;
   a wireless gateway comprising:
      a first communication device;
      a signal conversion module being connected with the first communication device;
      a micro-controller being connected with the signal conversion module;
      a second communication device being connected with the micro-controller and in communication with the wireless communication module of each LED lamp; and
      an AC/DC power module being connected with the micro-controller; and
   a smart device being in communication with the wireless gateway and configured to be controlled by a user;
   wherein:
   the signal conversion module is configured to convert communication data between the first communication device and the second communication device;
   the AC/DC power module is configured to convert AC power into DC power to supply to the first communication device, the second communication device, the micro-controller and the signal conversion module; and
   the micro-controller is configured to generate a unique lamp ID for each LED lamp, and embed the unique lamp ID into a signal for controlling each LED lamp through the wireless communication module so that the unique lamp ID is detectable in a form of visible light.

2. The system of claim 1, wherein the micro-controller and the second communication device are packaged together to form a communication module.

3. The system of claim 1 further comprising a router connected with the wireless gateway and configured to receive command signals from a mobile device or the Internet and send command signals to the wireless gateway.

4. The system of claim 1 further comprising a wireless sensor module, wherein the wireless sensor module comprises a micro-controller, a wireless communication device connected to the micro-controller, and a sensor connected to the micro-controller, the wireless communication device being configured to be in communication with the wireless gateway and the wireless communication module of each LED lamp.

5. The system of claim 4, wherein the sensor is an ambient light sensor, and configured to send an ambient light signal level to surrounding LED lamps, while the micro-controller of the wireless sensor module is configured to adjust light of each lamp according to the ambient light signal level.

6. The system of claim 4, wherein the sensor is a motion sensor, and configured to send a command to surrounding LED lamps to turn on the lamps upon detection of a motion signal.

7. The system of claim 1, wherein the smart device comprises an optical receiver configured to receive visible light data generated from the LED lamps.

8. The system of claim 7, wherein the optical receiver is a dongle comprising an optical sensor configured to receive a lamp ID modulated by light, a detection circuit connected to the optical sensor and configured to demodulate the lamp ID, a micro-controller connected with the detection circuit and configured to send command signals and receive signals, and a USB interface connected to the micro-controller and configured to transfer data to the smart device.

9. The system of claim 1 further comprising a detection circuit, wherein the detection circuit comprises a filtering circuit configured to filter out visible light signal, and a competitor connected to the filtering circuit and configured to take an output of the filtering circuit and a received visible light signal as inputs thereof.

10. The system of claim 1 further comprising a LED driver for driving each LED lamp, wherein a guard time is present between a time period for generation of lamp ID data by the LED driver and a time period for receiving a command from a user to switch the system from a configuration mode to a lighting control mode.

11. The system of claim 1, wherein the signal for controlling each LED lamp is a PWM signal, while data rate of the lamp ID is higher than that of the PWM signal.

12. The system of claim 11, wherein a start bit and a stop bit along with data of the lamp ID are embedded together into the PWM signal.

13. The system of claim 12, wherein data of an original lamp ID plus inversed data of the original lamp ID are embedded into the PWM signal.

14. A method for wirelessly controlling LED lighting comprising:
   turning on a plurality of LED lamps with a preset level;

generating a unique lamp ID for each LED lamp and embedding the unique lamp ID into a signal for controlling the LED lamp through a wireless gateway and a wireless communication module;

placing a smart device under light of a LED lamp and entering a configuration mode;

receiving the lamp ID of the LED lamp, displaying the lamp ID in a user interface of the smart device, and designating an icon to represent the LED lamp in the user interface;

switching to a lighting control mode and stopping the LED lamp from generating lamp IDs; and controlling the LED lamps with the signal by a user through a user interface on the smart device;

wherein the wireless gateway comprises:
   a first communication device;
   a signal conversion module being connected with the first communication device;
   a micro-controller being connected with the signal conversion module;
   a second communication device being connected with the micro-controller and in communication with the wireless communication module of each LED lamp; and
   an AC/DC power module being connected with the micro-controller.

15. The method of claim 14, wherein the signal for controlling each LED lamp is a PWM signal, while data rate of the lamp ID is higher than that of the PWM signal.

16. The method of claim 15, wherein a start bit and a stop bit along with data of the lamp ID are embedded together into the PWM signal.

17. The method of claim 16, wherein data of an original lamp ID plus inversed data of the original lamp ID are embedded into the PWM signal.

* * * * *